United States Patent
Jang et al.

(10) Patent No.: US 10,303,701 B1
(45) Date of Patent: May 28, 2019

(54) REAL-TIME INTEGRATED REPLICATION SYSTEM BETWEEN DATABASES

(71) Applicant: DATABANK SYSTEMS LTD., Daegu (KR)

(72) Inventors: Yun Chul Jang, Daegu (KR); Jong Soo Lee, Daegu (KR); Kiuk Kwon, Seoul (KR)

(73) Assignee: DATABANK SYSTEMS LTD., Daegu (KR)

( * ) Notice: Subject to any disclaimer, the term of this patent is extended or adjusted under 35 U.S.C. 154(b) by 0 days.

(21) Appl. No.: 15/770,214

(22) PCT Filed: Nov. 17, 2017

(86) PCT No.: PCT/KR2017/013091
§ 371 (c)(1),
(2) Date: Dec. 17, 2018

(87) PCT Pub. No.: WO2019/074155
PCT Pub. Date: Apr. 18, 2019

(30) Foreign Application Priority Data

Oct. 11, 2017 (KR) ........................ 10-2017-0129429

(51) Int. Cl.
*G06F 16/23* (2019.01)
*G06F 16/27* (2019.01)
*G06F 16/215* (2019.01)

(52) U.S. Cl.
CPC .......... *G06F 16/275* (2019.01); *G06F 16/215* (2019.01); *G06F 16/2379* (2019.01)

(58) Field of Classification Search
CPC ........ G06F 16/275; G06F 16/27; G06F 16/23; G06F 16/2379
See application file for complete search history.

(56) References Cited

U.S. PATENT DOCUMENTS

2014/0068587 A1* 3/2014 Krishna ................... G06F 8/65
717/169
2014/0304229 A1* 10/2014 Zhu ......................... G06F 16/27
707/634

(Continued)

FOREIGN PATENT DOCUMENTS

KR 10-2003-0015171 A 2/2003
KR 10-2008-0102622 A 11/2008

(Continued)

*Primary Examiner* — Cam Y T Truong
(74) *Attorney, Agent, or Firm* — Park, Kim & Suh, LLC

(57) ABSTRACT

Disclosed is an integrated replication system. The integrated replication system may include a reader configured to collect information including a transaction or QSL information indicative of data changes of a source system, a storage module configured to store the information collected by the reader, a replication module configured to replicate change data of the source system to a target system according to a first replication method or a second replication method, a selection module configured to control a replication module in order to selectively apply any one of the first replication method and the second replication method according to a predetermined criterion, and a deletion module configured to delete data after a specific point of time when a change of the replication method is generated by the replication module.

2 Claims, 7 Drawing Sheets

(56) References Cited

U.S. PATENT DOCUMENTS

2015/0032695 A1\* 1/2015 Tran .................. G06F 16/273
                                                          707/625
2015/0278329 A1   10/2015 Hrle et al.

FOREIGN PATENT DOCUMENTS

| KR | 10-0891036 B1    | 3/2009  |
|----|------------------|---------|
| KR | 10-2009-0123518 A| 12/2009 |
| KR | 10-2010-0061983 A| 6/2010  |
| KR | 10-2014-0050903 A| 4/2014  |

\* cited by examiner

REAL-TIME INTEGRATED REPLICATION SYSTEM BETWEEN DATABASES

CROSS-REFERENCE TO RELATED APPLICATIONS

This application is the National Stage filing under 35 U.S.C. 371 of International Application No. PCT/KR2017/013091, filed on Nov. 17, 2017, which claims the benefit of Korean Patent Application No. 10-2017-0129429, filed on Oct. 11, 2017, the contents of which are all hereby incorporated by reference herein in their entirety.

TECHNICAL FIELD

The present invention relates to an integrated replication system and, more particularly, to a real-time integrated replication system between heterogeneous databases for switching, transfer and integration between various databases, and to research result of "s/w technical development for real-time data extraction, cleaning and replication between various heterogeneous databases.

DESCRIPTION OF THE RELATED ART

As typical and atypical databases are recently diversified, an information management environment becomes more complicated. An environment in which data must be comprehensively managed in various IT environments is encountered.

In an environment including almost infinite data scattered in various forms with the advent of the big data era, companies have had an essential object of obtaining valuable information through meaningful data by performing leaning company-wide data integration for a business success.

Furthermore, recently, as data continues to explosively increase within a company and real-time-based services continue to increase, many companies try to maintain always flexible IT infrastructure.

Furthermore, with the sudden development of the cloud and big data industry, there is an increasing need for an integration management system for listing, moving and analyzing rapidly increasing data.

SUMMARY OF THE INVENTION

Technical Problem

An object of the present invention is to overcome a limit that the replication solution of a database does not support the real-time replication of a heterogeneous database and to provide a system capable of maintaining the continuity of business by replicating data in real time.

Another object of the present invention is to provide a system capable of minimizing a load of a database server and a network through a technology for guaranteeing the consistency of replicated data and a changed data replication technology.

Yet another object of the present invention is to provide a system capable of enhancing the availability of data by enabling the real-time verification of the consistency of data and real-time correction of data.

Technical Solution

An integrated replication system according to an embodiment of the present invention may include a reader configured to collect information including a transaction or QSL information indicative of data changes of a source system, a storage module configured to store the information collected by the reader, a replication module configured to replicate change data of the source system to the target system through a first replication method or a second replication method, and a selection module configured to control the replication module in order to selectively apply any one of the first replication method and the second replication method according to a predetermined criterion.

Furthermore, the replication module includes a first replication module configured to execute the first replication method and a second replication module configured to execute the second replication method. The first replication module may extract data of the source system for each transaction and replicate change data of the source system to the target system when Commit is executed for the source system so that a transaction is completed.

The second replication module may extract data of the source system for each SQL, may capture and extract the data of the source system for each SQL, may transmit a corresponding log to the target system, and may replicate change data of the source system to the target system when Commit is executed.

Furthermore, the selection module may first execute the first replication module, and may change a replication method by selecting and executing the second replication module if a predetermined criterion is satisfied.

Furthermore, the selection module may include a transaction determination module configured to determine whether an amount of transaction data transmitted from the source system to the target system exceeds a predetermined amount of data by comparing the amount of transaction data with the predetermined amount of data and a control module configured to drive the second replication module in order to select the second replication method if, as a result of the determination of the transaction determination module, the amount of transaction data exceeds the predetermined amount of data.

Furthermore, the control module may stop the driving of the first replication module in order to change the replication method from the first replication method to the second replication method when driving the second replication module.

Furthermore, when a transaction is completed by a Commit, the control module controls the replication module so that an identifier is attached to the transaction in order to distinguish between transactions.

Furthermore, when a change into the first replication method is generated, the deletion module searches for a final identifier which belongs to identifiers attached after the transaction and which is lastly attached, and deletes subsequent data.

Advantageous Effects

An advantage of the present invention is to overcome a limit that the replication solution of a database does not support the real-time replication of a heterogeneous database and to provide a system capable of maintaining the continuity of business by replicating data in real time.

Another advantage of the present invention is to provide a system capable of minimizing a load of a database server and a network through a technology for guaranteeing the consistency of replicated data and a changed data replication technology.

Yet another advantage of the present invention is to provide a system capable of enhancing the availability of data by enabling the real-time verification of the consistency of data and real-time correction of data.

Another advantage of the present invention is to replicate change data correctly, by deleting data after a specific point of time when a change of the replication method is generated.

DETAILED DESCRIPTION

Figure 1:
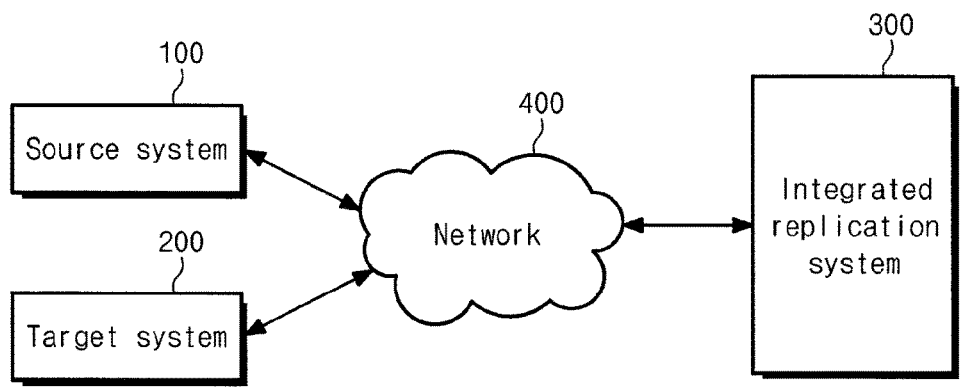
FIG. 1 is a diagram for illustrating an integrated replication system according to an embodiment of the present invention.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments.

It will be understood that when an element is referred to as being "connected" or "coupled" to another element, it may be directly connected or coupled to the other element or intervening elements may be present.

In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of the invention. As used herein, the singular forms are intended to include the plural forms as well, unless the context clearly indicates otherwise.

It will be further understood that the terms "comprises" and/or "comprising," or "includes" and/or "including" when used in this specification, specify the presence of stated features, integers, steps, operations, elements, components and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, the inventive concept will be described in detail by explaining embodiments of the inventive concept with reference to the attached drawings. Like reference numerals in the drawings denote like elements.

FIG. 1 is a diagram for illustrating an integrated replication system according to an embodiment of the present invention, and schematically shows a replication environment according to an embodiment of the present invention.

The integrated replication system 300 is connected to a source system 100 and a target system 200 over a network 400, and performs the replication of data from the source system 100 to the target system 200.

The network 400 may include a communication link known to a person having ordinary skill in the art, such as the Internet or a computer network. The network may include a telephone or a cable service, a wired or satellite service, etc.

The source system 100 and the target system 200 configure and store data according to a database management system (DMBS).

The integrated replication system 300 captures a change of data in the source system 100, selects a first replication method or a second replication method for the change, and transmits the data to the target system 200 through the selected replication method, so the data of the source system 100 and the data of the target system 200 are synchronized.

The integrated replication system 300 may provide a load balancing function based on the hardware and software elements of various computing apparatus or system. Furthermore, the integrated replication system 300 may provide a broadcast or integration function in which a local copy is synchronized with the central copy of a database and vice versa.

The integrated replication system 300 is described in detail below.

Figure 2:
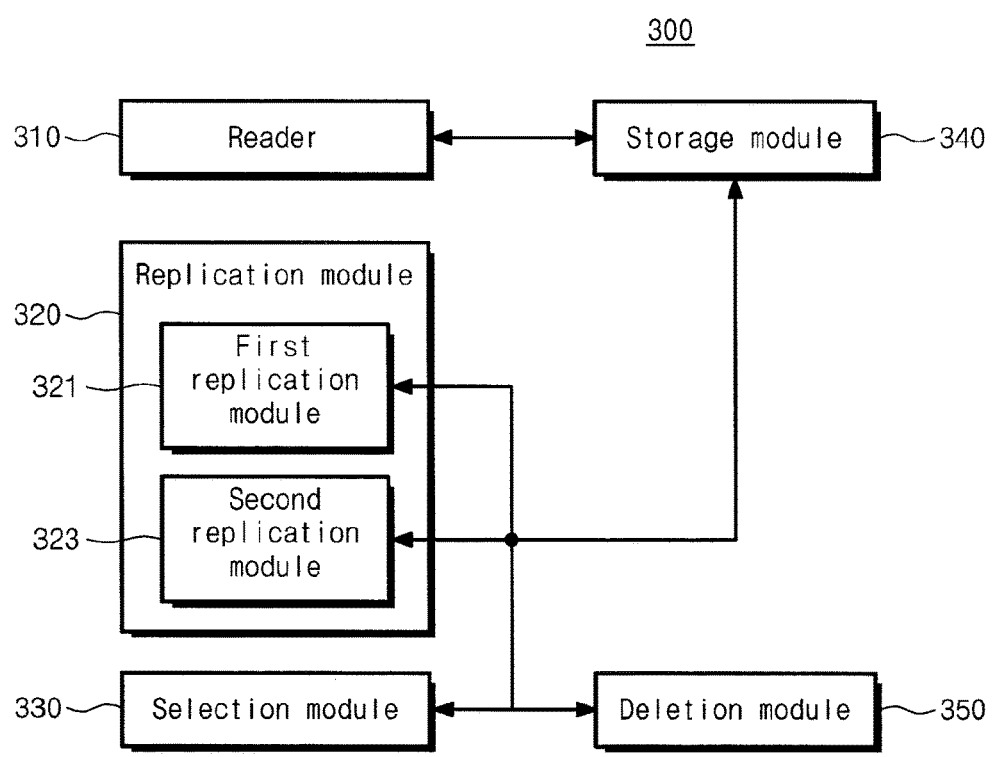
FIG. 2 is a block diagram for specifically illustrating the integrated replication system of FIG. 1.

FIG. 2 is a block diagram for specifically illustrating the integrated replication system of FIG. 1. The integrated replication system 300 includes a reader 310, a replication module 320, a selection module 330, a storage module 340, and a deletion module 350. The replication module 320 includes a first replication module 321 and a second replication module 323.

The reader 310 may analyze log files of the source system 100. For example, the reader 310 may collect a transaction or QSL information indicative of data changes of the source system 100, and enables the collected information to be stored in the storage module 340.

The replication module 320 replicates change data of the source system 100 to the target system 200 through a specific method (e.g., a first replication method or a second replication method).

The first replication module 321 may extract data of the source system 100 for each transaction. For example, when Commit that instructs the source system 100 so that a transaction is completed is executed, the first replication module 321 replicates change data of the source system 100 to the target system 200.

For example, when Commit is executed, the first replication module 321 transmits a corresponding committed log to the target system 200 so that change data corresponding to the committed log is applied and replicated to the target system 200.

That is, when change data is captured through Commit for each transaction and the Commit is executed, the first replication module 321 extracts the change data and transmits a corresponding committed log to the target system 200 so that the change data is applied, that is, replicated to the target system 200.

The first replication module 321 has an advantage in that unnecessary rollback data transmission is not generated, but when a large amount of transactions is generated, a second method may be selected under a specific condition by taking into consideration an increase of an instant load and reflection time.

The second replication module 323 may extract data of the source system 100 for each SQL. For example, data of the source system 100 is captured and extracted for each SQL, and a corresponding log is transmitted to the target system 200.

Thereafter, when Commit is executed, the second replication module 323 applies the change data of the source system 100 to the target system 200, that is, the change data is replicated to the target system 200.

Although Commit is not executed, the second replication module 323 transmits the log of data extracted for each SQL to the target system 200. Thereafter, when Commit is executed, the second replication module 323 applies change data corresponding to the committed log to the target system 200 so that the change data is replicated to the target system 200.

The selection module 330 may select and execute one of the first replication module 321 and the second replication module 323 in order to selectively apply the first replication method and the second replication method situationally according to a predetermined criterion.

The selection module 330 may be configured to basically execute the first replication module 321 first and to select and execute the second replication module 323 if a predetermined criterion is satisfied.

For example, when a change into the first replication method is generated while the second replication method is executed by the second replication module 323, the deletion module 350 searches for the final identifier attached to the end of one transaction and deletes subsequent data.

If replication is performed by the second replication method, data is extracted for each SQL and a corresponding data log is transmitted to the target system 200. Accordingly, if a change into the first replication method of transmitting data for each transaction is generated, the deletion module 350 searches for the final identifier ID_2 and deletes subsequent data.

Figure 3:
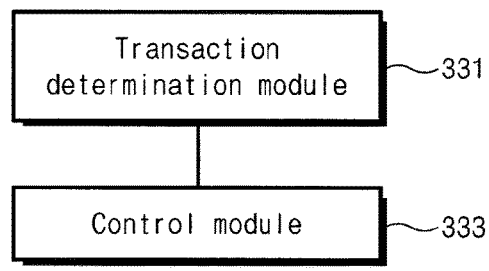
FIG. 3 is a block diagram for specifically illustrating a selection module of FIG. 2.

FIG. 3 is a block diagram for specifically illustrating a selection module of FIG. 2. The selection module 330 includes a transaction determination module 331 and a control module 333.

The transaction determination module 331 determines whether the amount of transaction data transmitted from the source system 100 to the target system 200 exceeds a predetermined amount of data by comparing the amount of transaction data with the predetermined amount of data.

If, as a result of the determination, it is determined that the amount of transaction data exceeds the predetermined amount of data, the control module 333 drives the second replication module 323 in order to select the second replication method.

That is, the control module 333 changes a replication method from the first replication method to the second replication method, thereby stopping the driving of the first replication module 321 and activating the second replication module 323.

Figure 4:
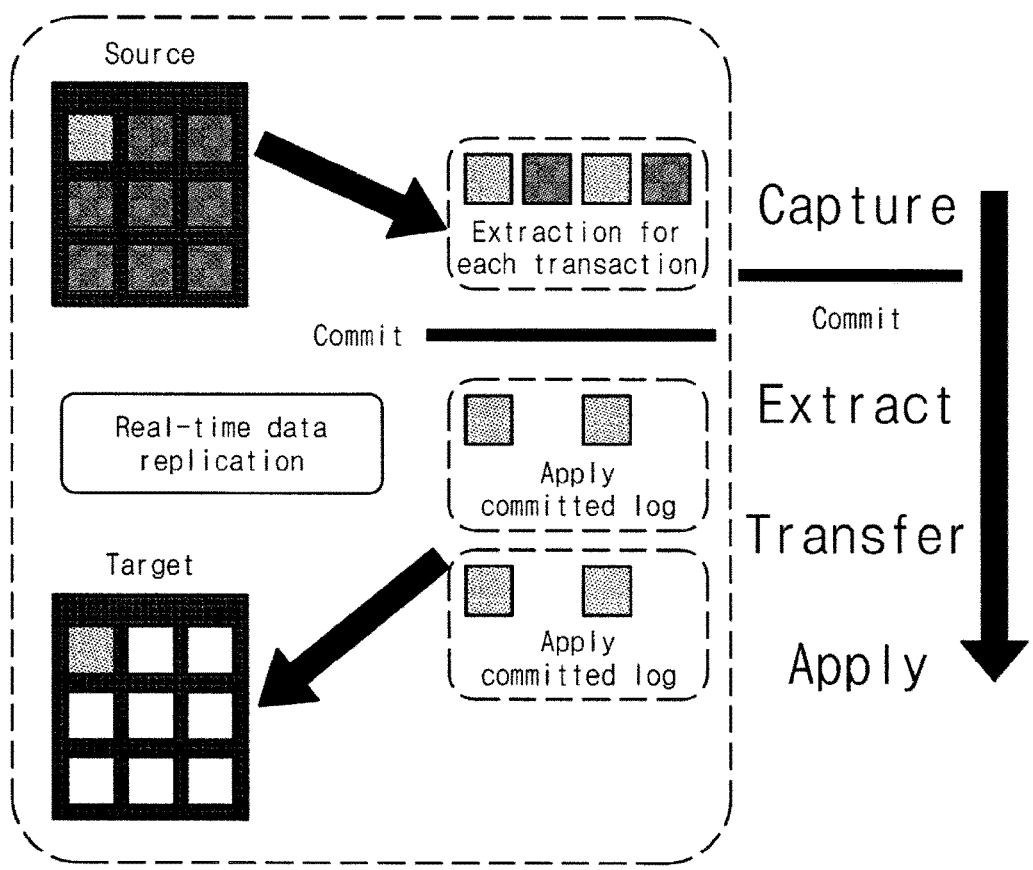
FIG. 4 is a diagram for illustrating a first replication method of the integrated replication system according to an embodiment of the present invention.

FIG. 4 is a diagram for illustrating the first replication method of the integrated replication system according to an embodiment of the present invention. The first replication method is executed by the first replication module 321 of the integrated replication system 300 shown in FIG. 2.

The first replication module 321 may extract data of the source system 100 for each transaction. For example, when Commit that instructs the source system 100 so that a transaction is completed is executed, the first replication module 321 replicates the change data of the source system 100 to the target system 200.

For example, when Commit is executed, the first replication module 321 transmits a committed log to the target system 200 so that change data corresponding to the committed log is applied and replicated to the target system 200.

That is, when change data is captured for each transaction through Commit and the Commit is executed, the first replication module 321 extracts the change data and transmits a corresponding committed log to the target system 200 so that the change data is applied, that is, replicated to the target system 200.

Figure 5:
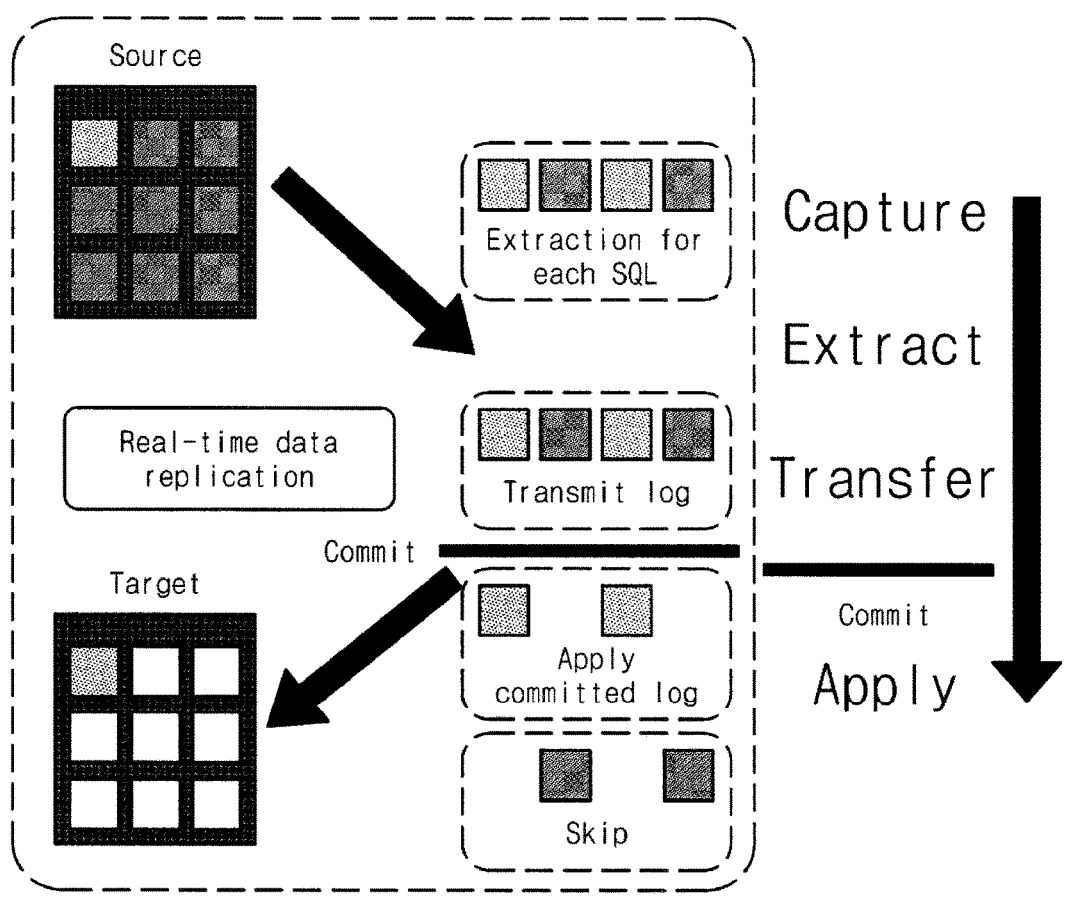
FIG. 5 is a diagram for illustrating a second replication method of the integrated replication system according to an embodiment of the present invention.

FIG. 5 is a diagram for illustrating the second replication method of the integrated replication system according to an embodiment of the present invention. The second replication method is executed by the second replication module 323 of the integrated replication system 300 shown in FIG. 2.

The second replication module 323 may extract data of the source system 100 for each SQL. For example, data of the source system 100 is captured and extracted for each SQL, and a corresponding log is transmitted to the target system 200.

Thereafter, when Commit is executed, the second replication module 323 applies, that is, replicates the change data of the source system 100 to the target system 200.

Although Commit is not executed, the second replication module 323 transmits the log of data extracted for each SQL to the target system 200. Thereafter, when Commit is executed, the second replication module 323 applies change data corresponding to the committed log to the target system 200 so that the change data is replicated.

Figure 6:
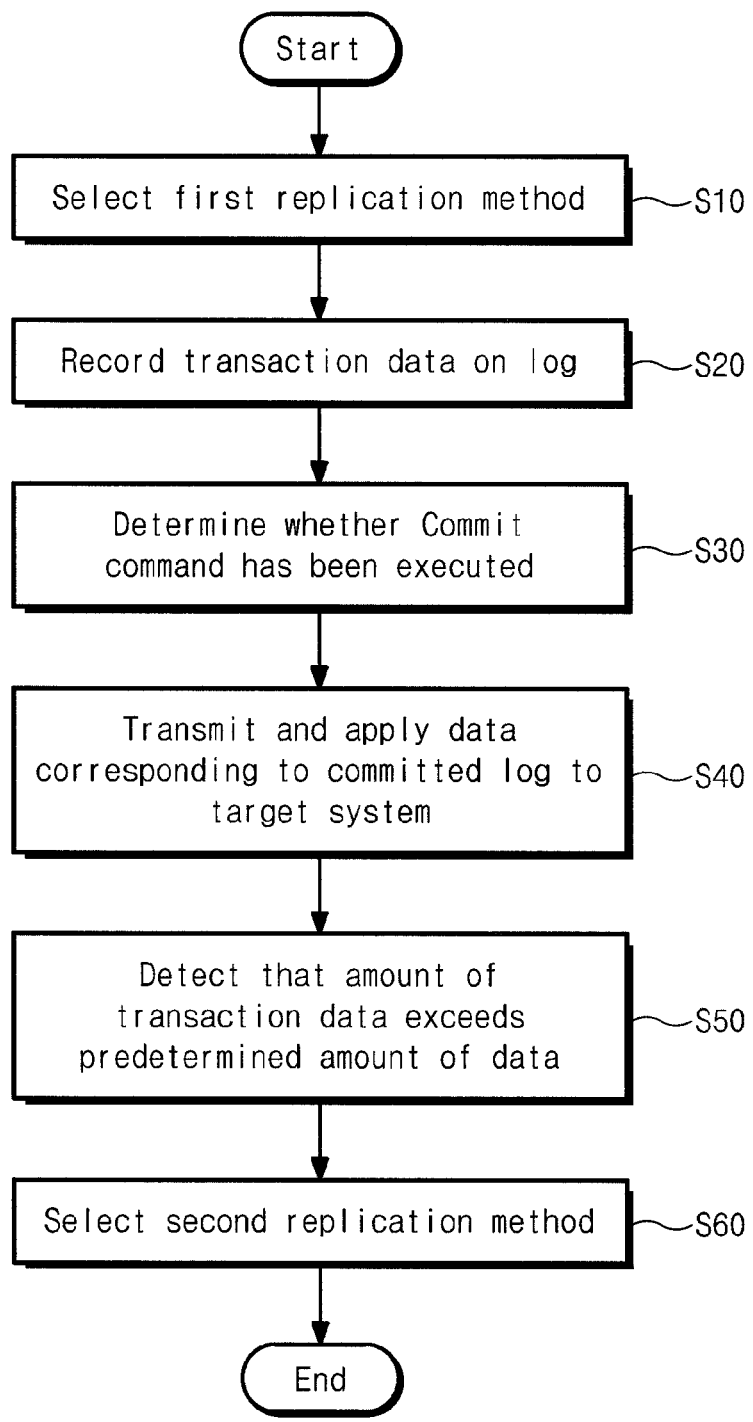
FIGS. 6 and 7 are diagrams for illustrating an integrated replication method according to an embodiment of the present invention.
Figure 7:
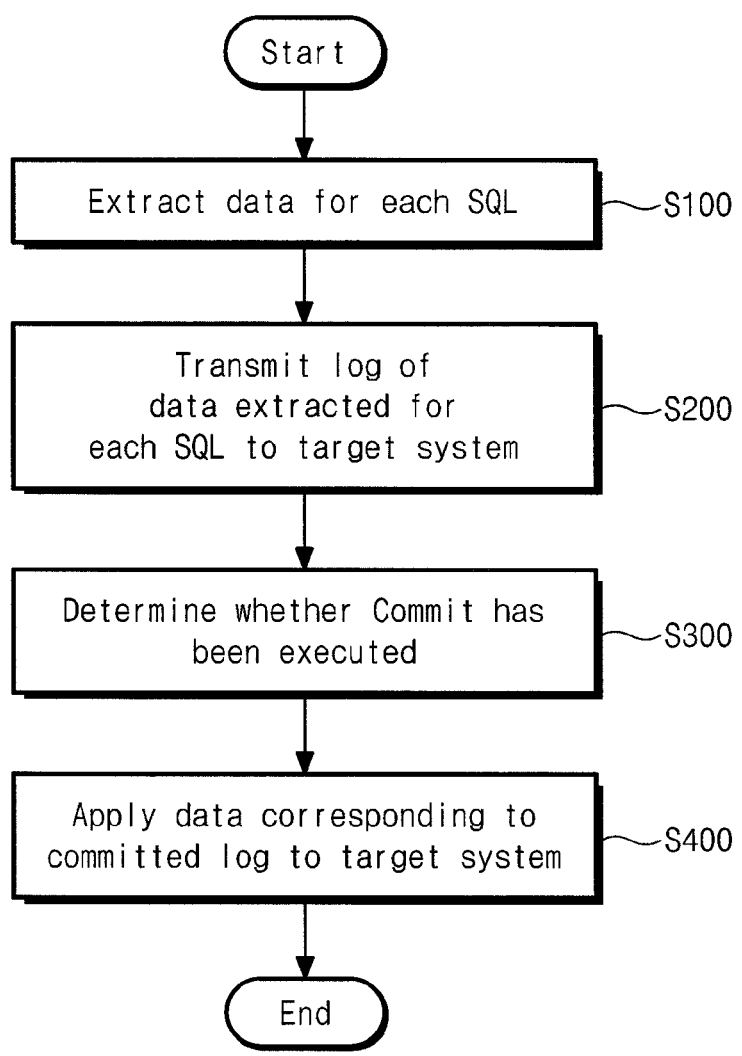

FIGS. 6 and 7 are diagrams for illustrating an integrated replication method according to an embodiment of the present invention. The integrated replication method may be performed by the integrated replication system 300 of FIG. 1.

Referring to FIG. 6, the integrated replication system 300 selects the first replication method by driving the first replication module 321 through the selection module 330 (S10).

Next, the integrated replication system 300 records transaction data on a log (S20) and determines whether a Commit command has been executed (S30).

When the Commit is executed, the extracted committed log is transmitted to the target system 200 and data corresponding to the committed log is applied, that is, replicated to the target system (S40).

Thereafter, the selection module 330 compares the amount of transaction data, transmitted from the source system 100 to the target system 200, with a predetermined amount of data. When the amount of transaction data exceeds the predetermined amount of data, the selection module 330 detects such an excess (S50), and drives the second replication module 323 in order to select the second replication method (S60).

FIG. 7 is a flowchart in which the second replication module 323 operates to select the second replication method.

Referring to FIG. 7, the integrated replication system 300 captures and extracts data for each SQL (S100). The log of the data extracted for each SQL is transmitted to the target system 200 (S200).

Thereafter, whether Commit is executed is determined (S300). If it is determined that Commit has been executed, data corresponding to the committed log is applied, that is, replicated to the target system 200 (S400).

The integrated replication system 300 according to an embodiment of the present invention may selectively apply the first replication method and the second replication method situationally according to a predetermined criterion. Accordingly, there is an effect in that one of the first replication method and the second replication method can be selectively used depending on a business characteristic of a user.

Figure 8:
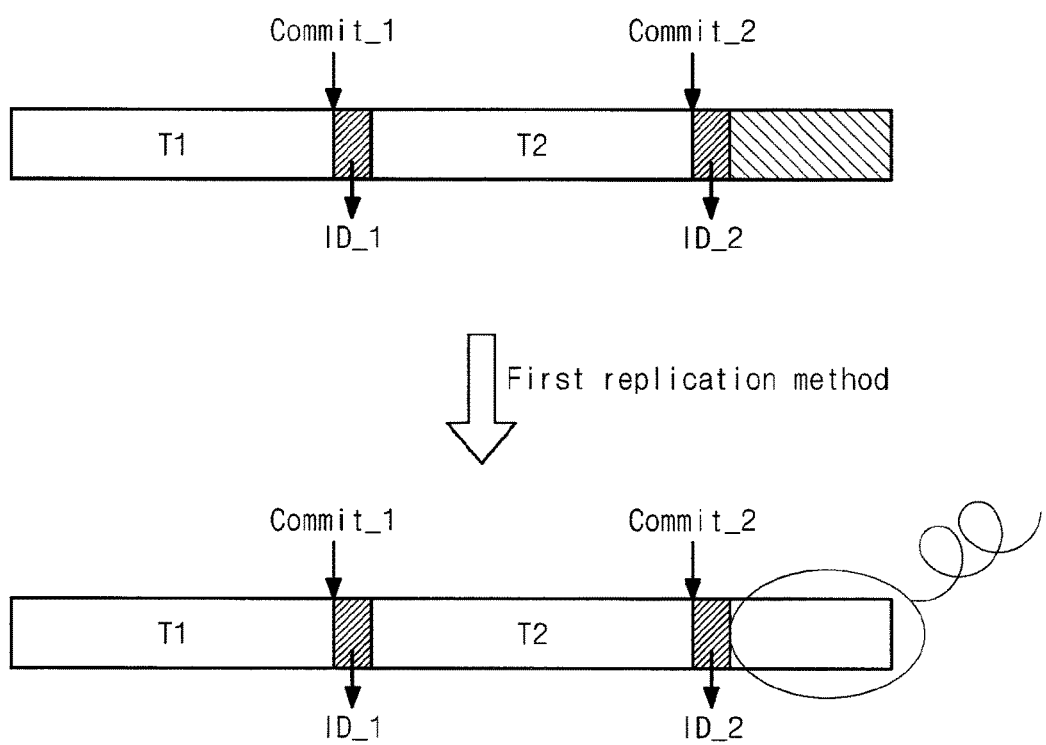
FIG. 8 is a diagram for illustrating an integrated replication method when a replication method according to an embodiment of the present invention.

FIG. 8 is a diagram for illustrating an integrated replication method when a replication method according to an embodiment of the present invention.

FIG. 8 shows a data deletion area when a change into the first replication method is generated while the second replication method is executed.

When transactions T1 and T2 are completed by Commits Commit_1 and Commit_2, identifiers ID_1 and ID_2 are attached to the ends of transactions T1 and T2, respectively. Accordingly, the transactions can be identified based on the identifiers ID_1 and ID_2.

If replication is performed by the second replication method, data is extracted for each SQL and a corresponding data log is transmitted to the target system 200. Accordingly, when a change into the first replication method of transmitting data for each transaction is generated, the final identifier ID_2 is searched for and subsequent data is deleted.

Figure 9:
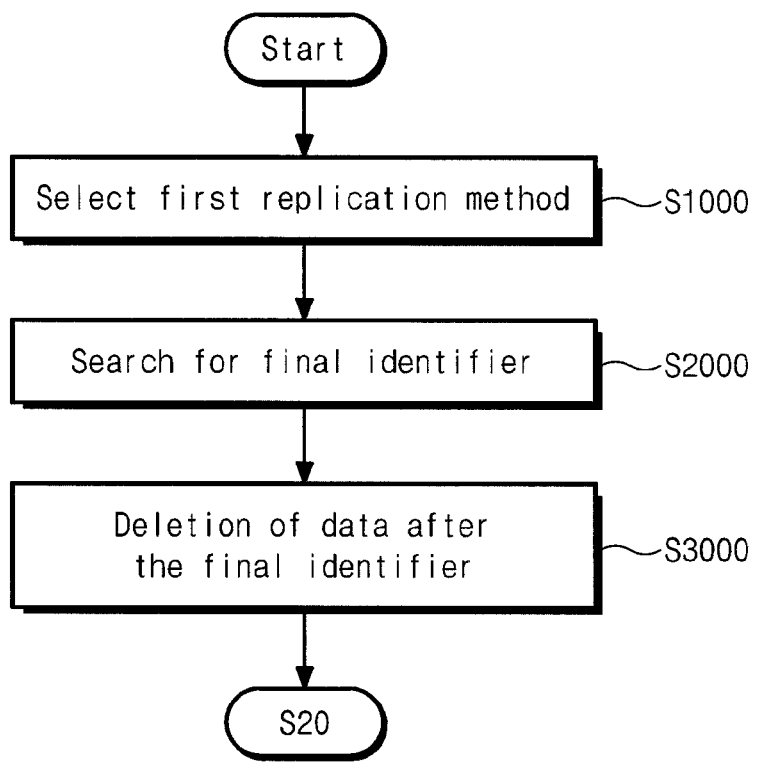
FIG. 9 is a flowchart illustrating an integrated replication method when a replication method is changed according to an embodiment of the present invention.

FIG. 9 is a flowchart illustrating an integrated replication method when a replication method is changed according to an embodiment of the present invention.

Referring to FIG. 9, when the selection module 330 selects the first replication method (S1000), the final identifier ID_2 is searched for as described with reference to FIG. 8 (S2000).

When the final identifier ID_2 is searched for, data subsequent to the final identifier ID_2 is deleted (S3000).

In accordance with the integrated replication system according to an embodiment of the present invention, a limit that the replication solution of a database does not support the real-time replication of a heterogeneous database can be overcome. Accordingly, there is an effect in that there can be provided a system capable of maintaining the continuity of business by replicating data in real time.

In accordance with the integrated replication system according to an embodiment of the present invention, there is an effect in that there can be provided a system capable of minimizing a load of a database server and a network through a technology for guaranteeing the consistency of replicated data and a changed data replication technology.

In accordance with the integrated replication system according to an embodiment of the present invention, there is an effect in that there can be provided a system capable of enhancing the availability of data by enabling the real-time verification of the consistency of data and real-time correction of data.

In accordance with the integrated replication system according to an embodiment of the present invention, there is an effect in that change data can be accurately replicated although there is a change in a replication method because data after a specific point of time is deleted.

While the present invention has been shown and described with reference to exemplary embodiments thereof, it will be understood by those of ordinary skill in the art that various changes in form and detail may be made herein without departing from the spirit and scope of the present invention, as defined by the following claims.

What is claimed is:

1. An integrated replication network system, comprising:
a hardware and modules that are executed to perform operations including:
collecting, by a reader, information comprising a-transaction data or Structure Query Language (SQL) information indicative of data changes of a source system;
storing in a storage module, the information collected by the reader;
replicating, by a replication module, the data changes of the source system to a target system according to a first replication method that is executed by a first replication module or a second replication method that is executed by a second replication module;
controlling, by a selection module, a replication module in order to selectively apply any one of the first replication method and the second replication method according to a predetermined criterion;
deleting, by a deletion module, data after a specific point of time when a change into the first replication method is generated by the replication module while the second replication method is executed by the second replication module, when the change into the first replication method is generated, the deletion module further searches for a final identifier which belongs to identifiers attached after the transaction and which is lastly attached, and deletes subsequent data,
the replication module comprises the first replication module and the second replication module, the first replication module extracts data of the source system for the transaction and replicates change data of the source system to the target system when Commit is executed for the source system so that the transaction is completed, and the second replication module captures and extracts the data of the source system for the SQL information, transmits a corresponding log to the target system, and replicates the change data of the source system to the target system when the Commit is executed, when the transaction is completed by the Commit, a control module controls the replication module so that an identifier is attached to the transaction in order to distinguish between transactions;

determining, by a transaction determination module, whether an amount of the transaction data transmitted from the source system to the target system exceeds a predetermined amount of data by comparing the amount of the transaction data with the predetermined amount of data;

driving, by a control module, the second replication module in order to select the second replication method for executing based on a result of the determination of the transaction determination module that the amount of transaction data exceeds the predetermined amount of data; and stopping, by the control module, the driving of the first replication module in order to change a replication method from the first replication method to the second replication method when driving the second replication module.

2. The integrated replication system of claim 1, wherein the selection module first executes the first replication module, and changes the replication method by selecting and executing the second replication module if a predetermined criterion is satisfied.

* * * * *